INVENTOR
ERNEST S. WARNER
ATTORNEY

2,733,743
BARK-REMOVING ROTOR HAVING BRAKE-ADVANCED PIVOTALLY MOUNTED TOOLS

Ernest S. Warner, Vancouver, British Columbia, Canada

Application March 14, 1955, Serial No. 493,933

5 Claims. (Cl. 144—208)

My invention relates to improvements in rotary type mechanical log barkers.

The objects of the invention are to provide a rotary type log barker having bark-stripping devices which are urged towards their work by friction means, the application of which is controlled by a simple well known friction brake capable of long term use without repair or replacement.

A further object is to provide a controlling mechanism for the stripping devices whereby the force applied by said devices to the log surface may be increased or decreased instantly and without effort, so that logs passing through the barker are cleanly stripped of its bark but substantially no damage is done beyond the cambium layer.

These and other objects will appear as the specification proceeds.

Referring to the accompanying drawings.

In the drawings like characters of reference indicate corresponding parts in each figure.

Figure 1:
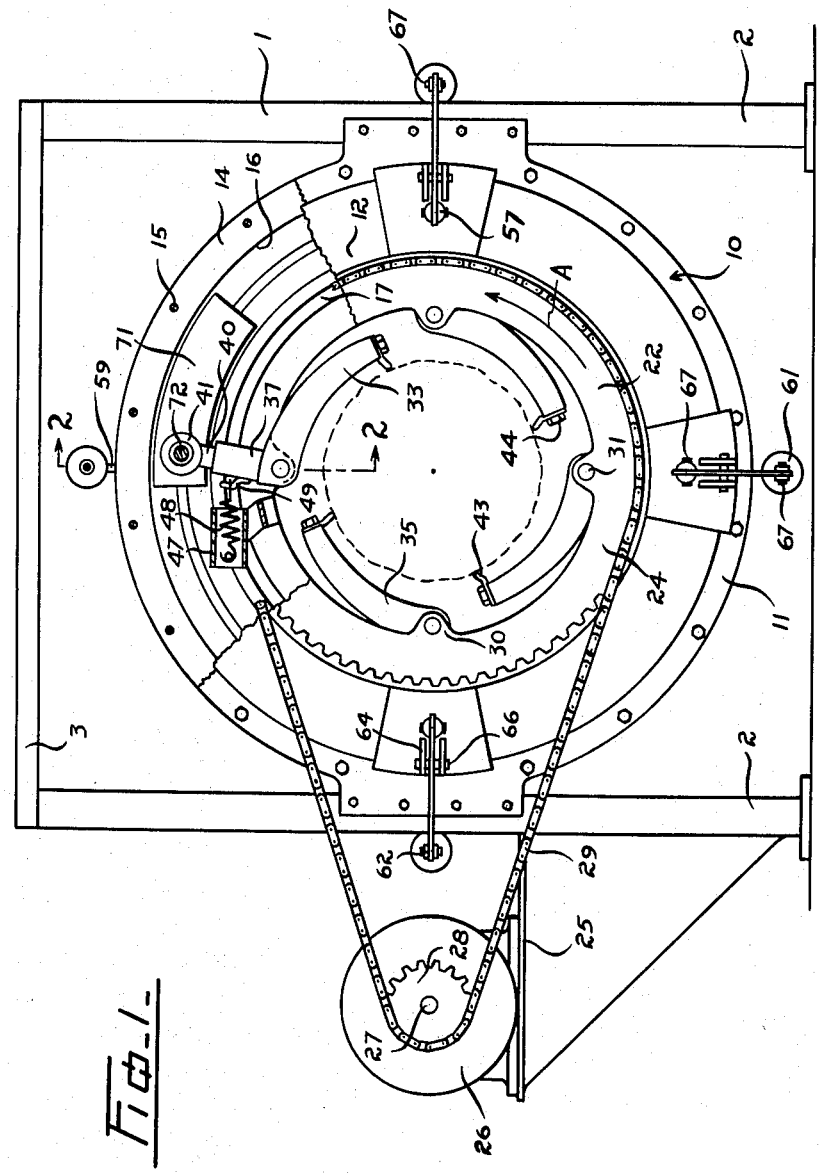
Figure 1 is an elevation of the invention.

Referring to Figure 1, the numeral 1 indicates a frame having vertical members 2 and a horizontal member 3, which frame supports a log barker generally indicated by the numeral 10. The barker is provided with a stator 11 made up of spaced annular members 12 and 14 which are secured together by bolts 15. Opposing channels 16 are defined in the annular members and said members have internal flanges 17 which support aligned sleeves 18. The sleeves 18 of the members 12 and 14 are fitted with bearings 20 and journalled in said bearings is a rotor 22 having spaced substantially L-shaped hub flanges 23. An annular sprocket 24 is secured to the outer edge of each hub flange 23. A platform 25 is provided on one of the vertical members 2 of the frame and supported upon said platform is a motor 26 having a drive shaft 27. The opposite ends of the drive shaft are fitted with sprockets 28, and chains 29 connect said sprockets with the sprockets 24 of the rotor.

Figure 4:
Figure 4 is a detail view of a knife supporting arm.
Figure 3:
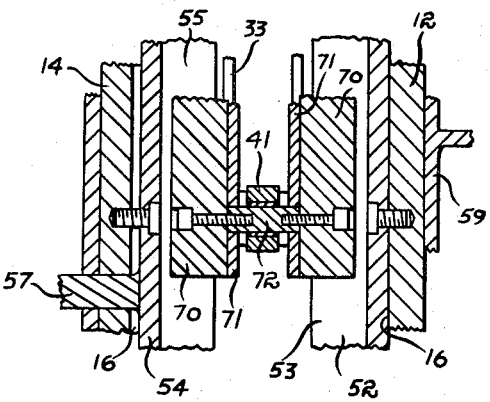
Figure 3 is a sectional plan view taken on the line 3—3 of Figure 2.

The inner edges of the rotor-hub flanges are provided with pairs of lugs 30 which are spaced ninety degrees apart and each pair of lugs is fitted with a pin 31. Pivotally mounted upon each pin 31 is a hoe-supporting bell crank or arm generally indicated at 33. The arms 33 each consist of arcuate side members 35, see particularly Figure 4, which are connected at one end by a cross bar 36 and at the other end by a normally radially projecting sleeve 37 having a cylindrical bore 38. Slidably mounted in the bore 38 is a short shaft or plunger 40 having an eye 41 at its free end. A hoe 43 is secured to the outer face of the cross bar 36 by a bolt 44 and has a bark-removing blade 45 which projects inwardly towards the center of the rotor at a slight angle to a radius of a log being acted upon by the machine. It will be noticed that the scraping edge 46 of the blade is rounded so that no tendency exists for said knife to cut into the wood as the bark is stripped from the log. Adjacent each knife arm 33 an open ended cylinder 47 is mounted in the rotor 22 and serves as an anchor and a housing for a spring 48 which is connected as at 49 to the sleeve 37, see Figure 1. The arms are thus normally drawn by their springs to a position where the hoes are disposed in close proximity to the inner periphery of the rotor to provide maximum clearance for a log entering said rotor.

Figure 2:
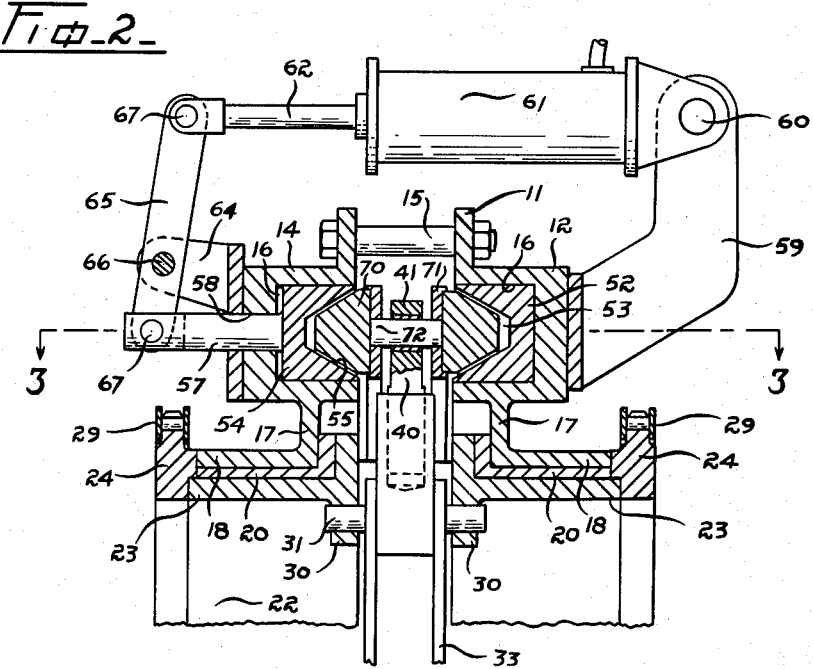
Figure 2 is an enlarged sectional view taken on the line 2—2 of Figure 1.

As shown in Figure 2, the channel 16 of the member 12 is fitted with an annular brake liner 52 which is non-rotatably held within said channel and is provided on its inner face with an annular V-shaped groove 53. A similar liner 54 having an annular V-shaped groove 55 is slidably fitted within the channel 16 of the member 14 and suitably spaced around the circumference of said liner are plungers 57 which project outwardly of the stator through openings 58. A bracket 59 is secured to the member 12 opposite each plunger 57 and secured to said bracket by a pivot pin 60 is a hydraulic cylinder 61 having a piston rod 62. The member 14 supports pairs of forked brackets 64 between which a rocking arm 65 is mounted upon a pin 66, and said rocking arm is pivotally connected to the plunger 57 and the piston rod 62 by means of pins 67. The cylinders 61 are connected to a suitable source of fluid pressure and are provided with a common control by which the operator can simultaneously actuate the cylinders to move the liner 54 towards and away from the liner 52. The opposing annular grooves of the liners are provided with pairs of arcuate brake blocks 70, which are fitted with brake shoes 71 and complementary pairs of said shoes are connected by a cylindrical link 72 which extends through the eye 41 of the adjoining plunger 40 and is freely slidable therein.

A log to be stripped of its bark is adapted to be fed through the rotor by means of a suitable conveyor, not shown. With the motor 26 rotating the rotor at an appropriate speed and in a counterclockwise direction, as indicated by the arrow A in Figure 1, the operator actuates the hydraulic cylinder control to move the liner 54 inwardly, which movement thrusts the connected brake blocks to the right as viewed in Figure 2, so that both liners apply equal restraint to said blocks. This braking pressure or drag upon the blocks causes each of the arms 33 to swing about their pivot pins 31 in a clockwise direction as shown in Figure 1 until the hoes 43 engage the surface of the log and break through the bark down to the cambium layer of the log. Sufficient pressure is maintained by the cylinders 61 on the brake blocks so that the rotating blades strip off the bark with a hoeing action which causes little or no damage to the wood. If an obstruction such as a knot is encountered, the hoe supporting arms are rocked in an anti-clockwise direction with the brake slipping to permit the movement to take place. The hoes thus are allowed to ride over the knot and since the braking pressure remains constant, said hoes re-engage the log immediately behind the knot and continue their stripping action.

What I claim as my invention is:

1. A log barker comprising a stator, an annular hollow rotor journalled within the stator and through both of which a log is adapted to be moved longitudinally, an arm pivoted to the rotor, said arm being pivoted intermediate its length adjacent an inner periphery of the rotor, said arm having a log-engaging element on its inner end and being operatively connected to a brake element, said stator having an annular nonrotary brake element movable in a direction parallel to an axis of rotation of the rotor and coacting with the first-named brake element to restrain the rotational movement of the arm about the stator, and means for urging the brake elements together.

2. A log barker as claimed in claim 1, wherein the brake-engaging element connected with the arm is a brake block and the annular brake-engaging element carried by the stator is adapted to frictionally contact the brake block and rock the arm about its pivot to move the log-engaging element towards the center of the rotor.

3. A log barker comprising a stator, an annular hollow rotor journalled within the stator and through both of which a log is adapted to be moved longitudinally, an arm pivoted to the rotor, said arm being pivoted intermediate its length adjacent an inner periphery of the rotor, said arm having a log-engaging element on its inner end and being operatively connected to a brake element, said stator having an annular nonrotary brake element coacting with the first-named brake element to restrain the rotational movement of the arm about the stator, the brake element connected to the arm being a brake block and the annular brake-engaging element being adapted for movement towards the brake block to frictionally contact it, and fluid-pressure-operated means for moving the annular brake-engaging element into frictional contact with the brake block.

4. A log barker comprising a stator, an annular hollow rotor journalled within the stator and through both of which a log is adapted to be moved longitudinally, a bell crank pivoted to the rotor, said bell crank being pivotally mounted adjacent an inner periphery of the rotor and adapted to swing in the plane about an axis parallel to an axis of rotation of said rotor, said bell crank having an arm fitted at its free end with a bark-removing hoe and an outwardly extending arm, said stator having a pair of annular brake liners, one of said liners being rigidly held and the second of said liners being mounted for movement in a direction parallel to said axis of rotation to and from the first-named liner, brake blocks pivotally connected to the outer end of the outwardly extending arm, said blocks being mounted for slight movement in said direction parallel to said axis of rotation and being retained between the annular brake liners, and means for urging said second annular brake liner into contact with the brake blocks and for moving said brake blocks into forceful contact with the first-named annular brake liner.

5. A log barker as claimed in claim 4, wherein a plurality of bell cranks and brake blocks are spaced around the rotor and wherein said last-named means comprises a piston of a hydraulic cylinder, said piston being operatively connected to said second brake liner to cause drag on each bell crank to move each of the bark-removing hoes into contact with a log passing through the rotor.

References Cited in the file of this patent

UNITED STATES PATENTS

| | | |
|---|---|---|
| 1,901,247 | Kinzbach | Mar 14, 1933 |
| 2,692,623 | Leffler | Oct. 26, 1954 |